(12) United States Patent
Kitayama

(10) Patent No.: US 7,327,240 B2
(45) Date of Patent: Feb. 5, 2008

(54) INDICATOR DEVICE FOR MOTOR DRIVEN VEHICLE

(75) Inventor: Kyosuke Kitayama, Wako (JP)

(73) Assignee: Honda Motor Co., Ltd., Minato-Ku (JP)

(*) Notice: Subject to any disclaimer, the term of this patent is extended or adjusted under 35 U.S.C. 154(b) by 211 days.

(21) Appl. No.: 11/198,162

(22) Filed: Aug. 8, 2005

(65) Prior Publication Data

US 2006/0038667 A1    Feb. 23, 2006

(30) Foreign Application Priority Data

Aug. 17, 2004    (JP) .............................. 2004-237121

(51) Int. Cl.
  *B60Q 1/00*   (2006.01)
(52) U.S. Cl. ..................... 340/438; 340/461; 340/462
(58) Field of Classification Search ............ 340/425.5, 340/427, 432, 438, 439, 441, 461, 462, 815.4; 345/33, 40; 701/200, 201
See application file for complete search history.

(56) References Cited

U.S. PATENT DOCUMENTS 5,017,916 A * 5/1991 Londt et al. ........... 340/870.13
5,453,939 A * 9/1995 Hoffman et al. ............. 702/183
6,517,890 B2 * 2/2003 Denecke et al. ................ 427/5
6,564,137 B2 * 5/2003 Minowa et al. ................ 701/70
7,119,764 B2 * 10/2006 Tanaka et al. ................. 345/40

FOREIGN PATENT DOCUMENTS

JP    2001-119802    4/2001

* cited by examiner

*Primary Examiner*—Van T. Trieu
(74) *Attorney, Agent, or Firm*—Westerman, Hattori, Daniels & Adrian, LLP.

(57) ABSTRACT

A motor driven vehicle having an indicator device that includes a speed indicating portion for indicating the running speed of the motor driven vehicle provided with an electric motor capable of imparting power to a driving wheel, plural running mode indicating portions for individually indicating a plurality of running modes of the vehicle, and vehicle operating condition indicating portions for indicating operating conditions of the vehicle, wherein the speed indicating portion, the plural running mode indicating portions and the vehicle operating condition indicating portions are arranged on a common indicating surface. In addition, the plural running mode indicating portions and the vehicle operating condition indicating portions are arranged in a continuously endless manner around the speed indicating portion.

5 Claims, 8 Drawing Sheets

INDICATOR DEVICE FOR MOTOR DRIVEN VEHICLE

FIELD OF THE INVENTION

The present invention relates to an indicator device for a motor vehicle having a speed indicating portion, a plurality of running mode indicating portions, and a plurality of vehicle operating condition indicating portions provided on a common indicating surface.

BACKGROUND OF THE INVENTION

An indicator device having a speed indicating portion and a mode indicating portion is generally known wherein such portions are horizontally disposed and spaced apart from one another. For example, such an indicator device is disclosed in Japanese Patent Laid-Open No. 2001-119802. However, a vehicle rider's eye movement is increased when the rider checks the vehicle speed and the running mode in this conventional design.

A hybrid type vehicle, for example, is provided with an engine in addition to an electric motor and typically has plural running modes. In hybrid vehicles, it is desirable to have running modes that are easily visually observed (e.g., without demanding increased eye movement.) However, such an outcome cannot be satisfied by the above conventional indicator device.

Therefore, it is an object of the present invention to provide an indicator device for a motor vehicle wherein the running speed, plural running modes and vehicle operating conditions can be observed with decreased eye movement.

SUMMARY OF THE INVENTION

According to a first aspect of the present invention, in order to attain the above objects, there is provided an indicator device for a motor vehicle wherein a speed indicating portion for indicating the running speed of the motor driven vehicle provided with an electric motor capable of imparting power to a driving wheel, plural running mode indicating portions for indicating a plurality of running modes of the motor driven vehicle each individually, and vehicle operating condition indicating portions for indicating operating conditions of the vehicle, are arranged on a common indicating surface, wherein the plural running mode indicating portions and the vehicle operating condition indicating portions are arranged in a continuously endless manner around the speed indicating portion.

Thus, since the plural running mode indicating portions and the vehicle operating condition indicating portions are arranged in a continuously endless manner around the speed indicating portion, it is possible to decrease the amount of movement of the rider's eyes and running speed, running modes and vehicle operating conditions can be checked easily. Moreover, it is possible to provide an efficient layout of the indicating portions on the indicating surface.

In a second aspect of the present invention, the plural running mode indicating portions and the vehicle operating condition indicating portions are each formed in a generally arcuate shape. Therefore, the indication areas of the plural running mode indicating portions and the vehicle operating condition indicating portions can be relatively large because those indicating portions are generally arcuate in shape. Accordingly, the vehicle rider can more effectively visually check operating conditions and running modes of the vehicle.

In a third aspect of the present invention, the plural running mode indicating portions and the vehicle operating condition indicating portions have mutually different indication colors. Accordingly, the vehicle rider can more effectively visually check operating conditions and running modes of the vehicle.

In a fourth aspect of the present invention, the motor driven vehicle is a hybrid type vehicle having an engine in addition to the electric motor. In this type of vehicle, the plural running mode indicating portions indicate a motor running mode in which the vehicle runs with only the electric motor, a special running mode in which a shift control is different from a normal shift control, and a series hybrid running mode in which the electric motor is driven with electric power generated by a generator, the generator being driven by an engine. Accordingly, in the vehicular indicator device having many running modes, it is possible to provide an efficient layout of indicating portions.

BRIEF DESCRIPTION OF THE DRAWINGS

A preferred embodiment of the present invention will be described with reference to the accompanying drawings, wherein.

DETAILED DESCRIPTION OF THE INVENTION

Embodiments of the invention will be described hereinafter with reference to the accompanying drawings.

Figure 1:
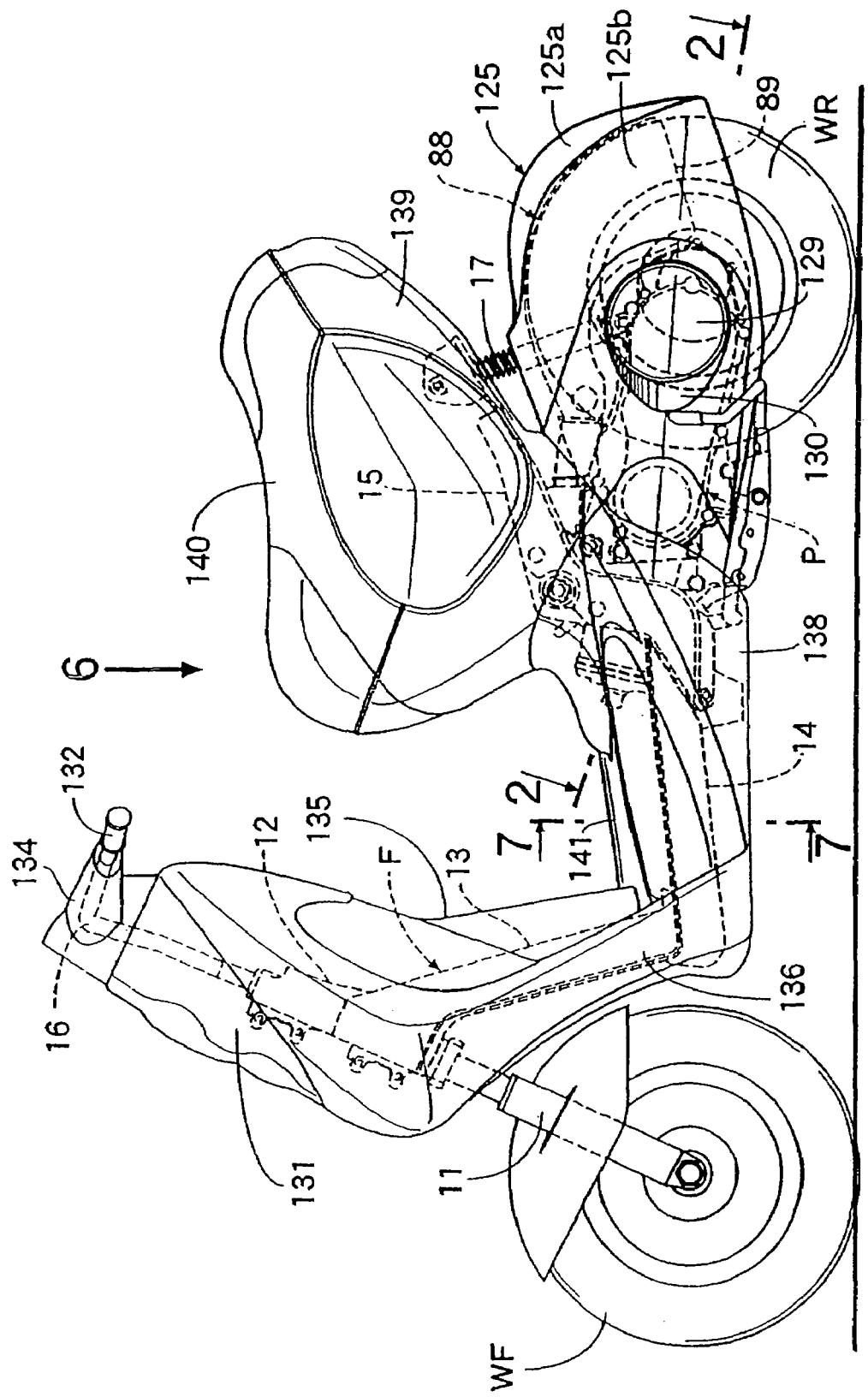
FIG. 1 is a side view of a motorcycle to which the present invention is applied.
Figure 2:
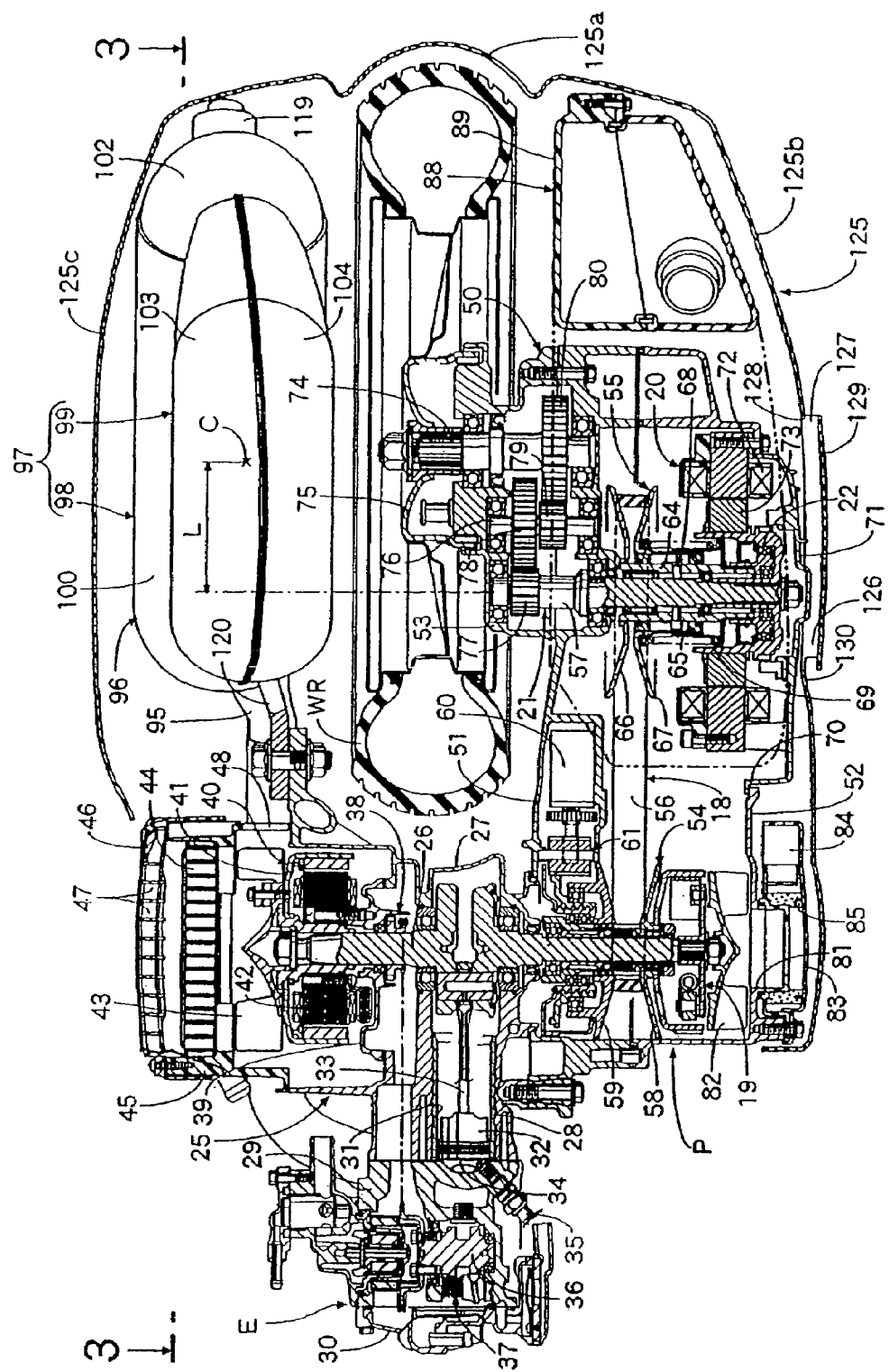
FIG. 2 is a sectional view taken on line 2-2 in FIG. 1.
Figure 3:
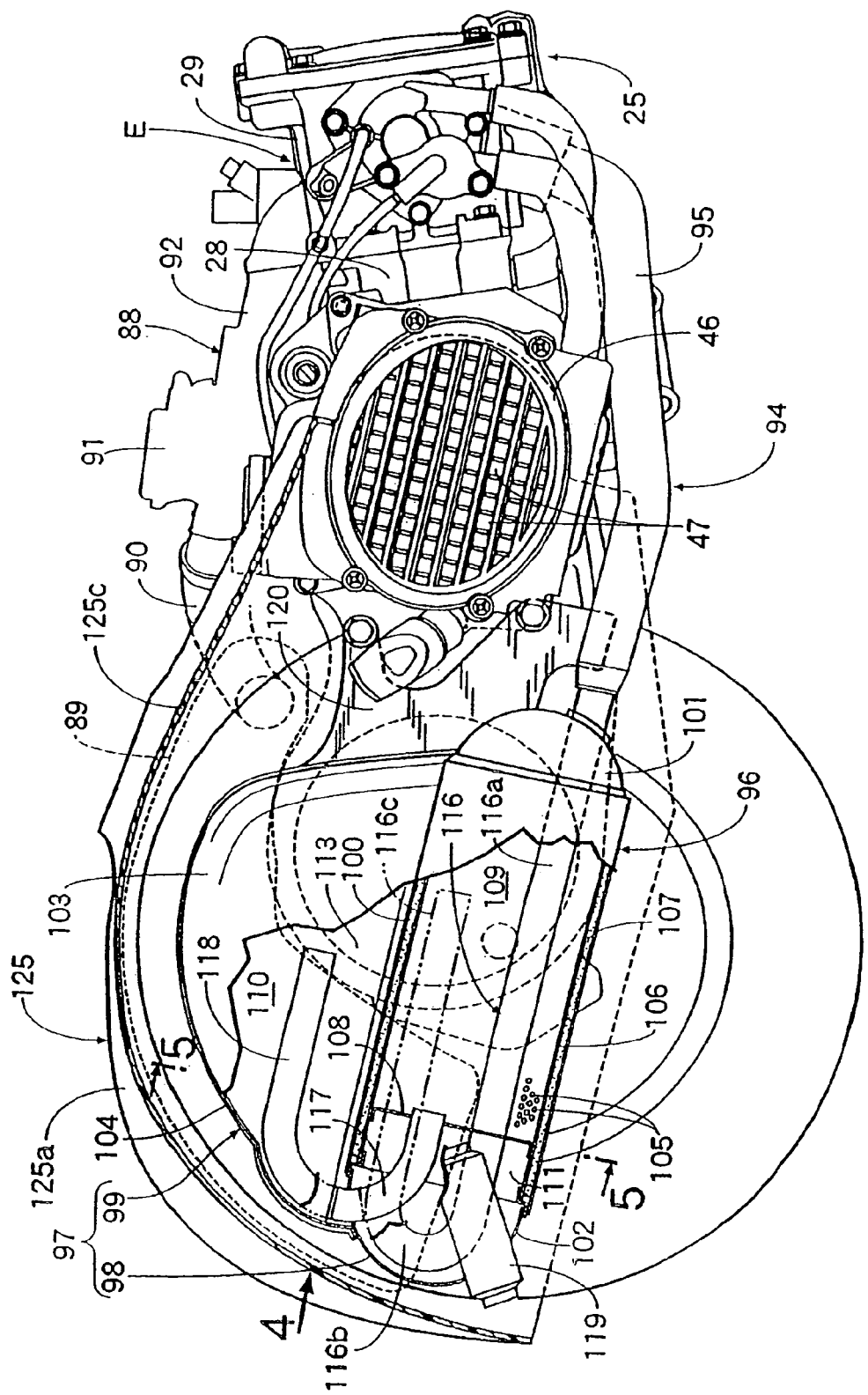
FIG. 3 is a sectional view taken on line 3-3 in FIG. 2.
Figure 4:
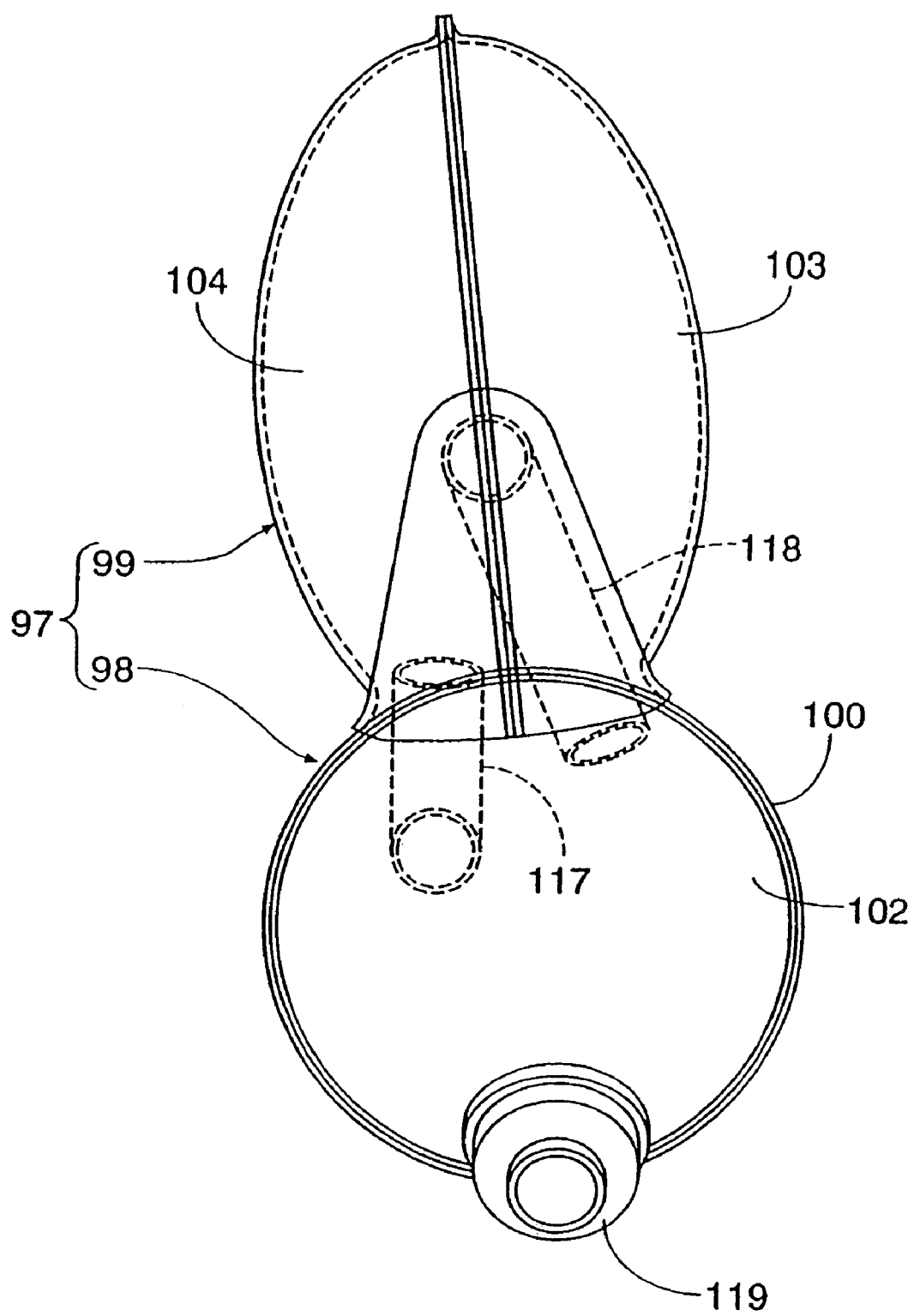
FIG. 4 is a rear view of an exhaust muffler as seen in the direction of arrow 4 in FIG. 3.
Figure 5:
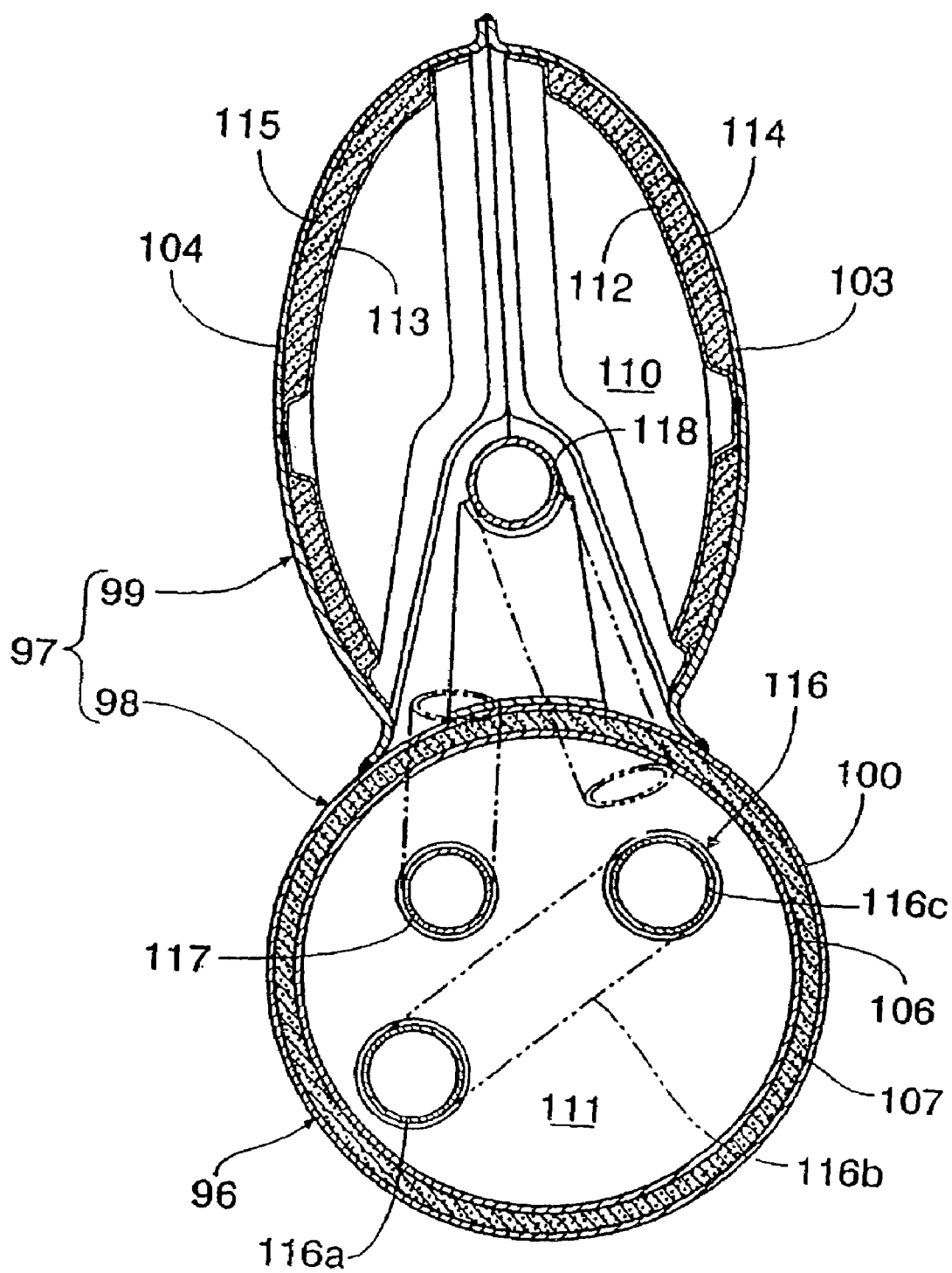
FIG. 5 is a sectional view taken on line 5-5 in FIG. 3.
Figure 6:
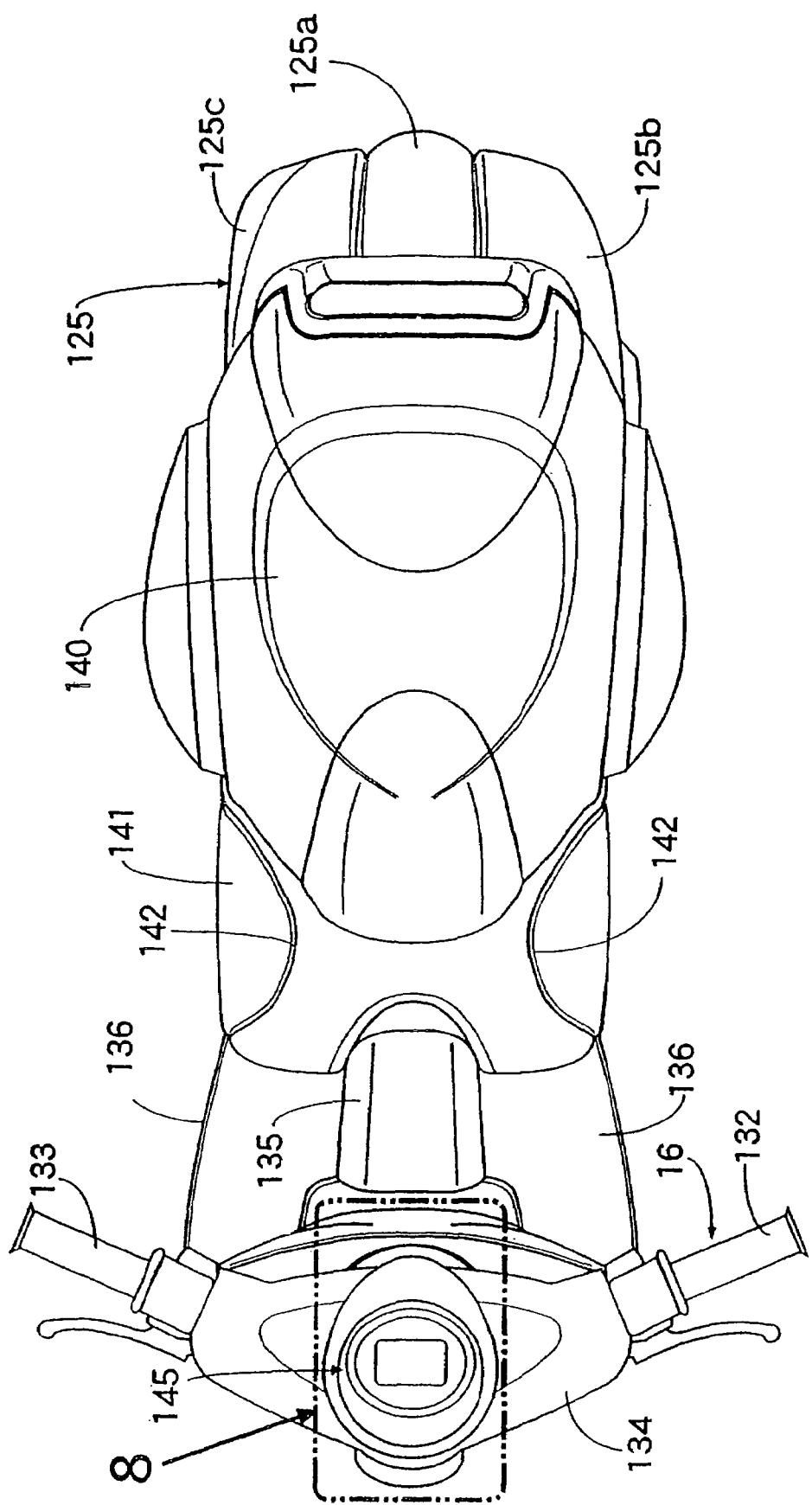
FIG. 6 is a plan view as seen in the direction of arrow 6 in FIG. 1.
Figure 7:
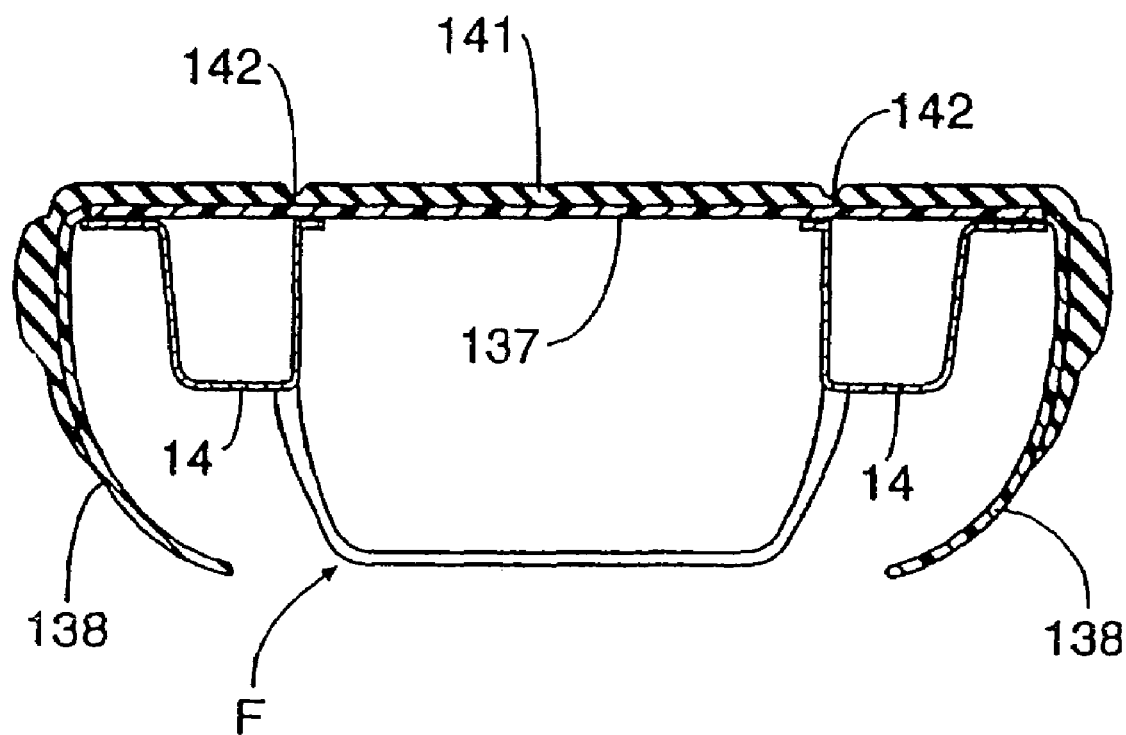
FIG. 7 is a sectional view taken on line 7-7 in FIG. 1.
Figure 8:
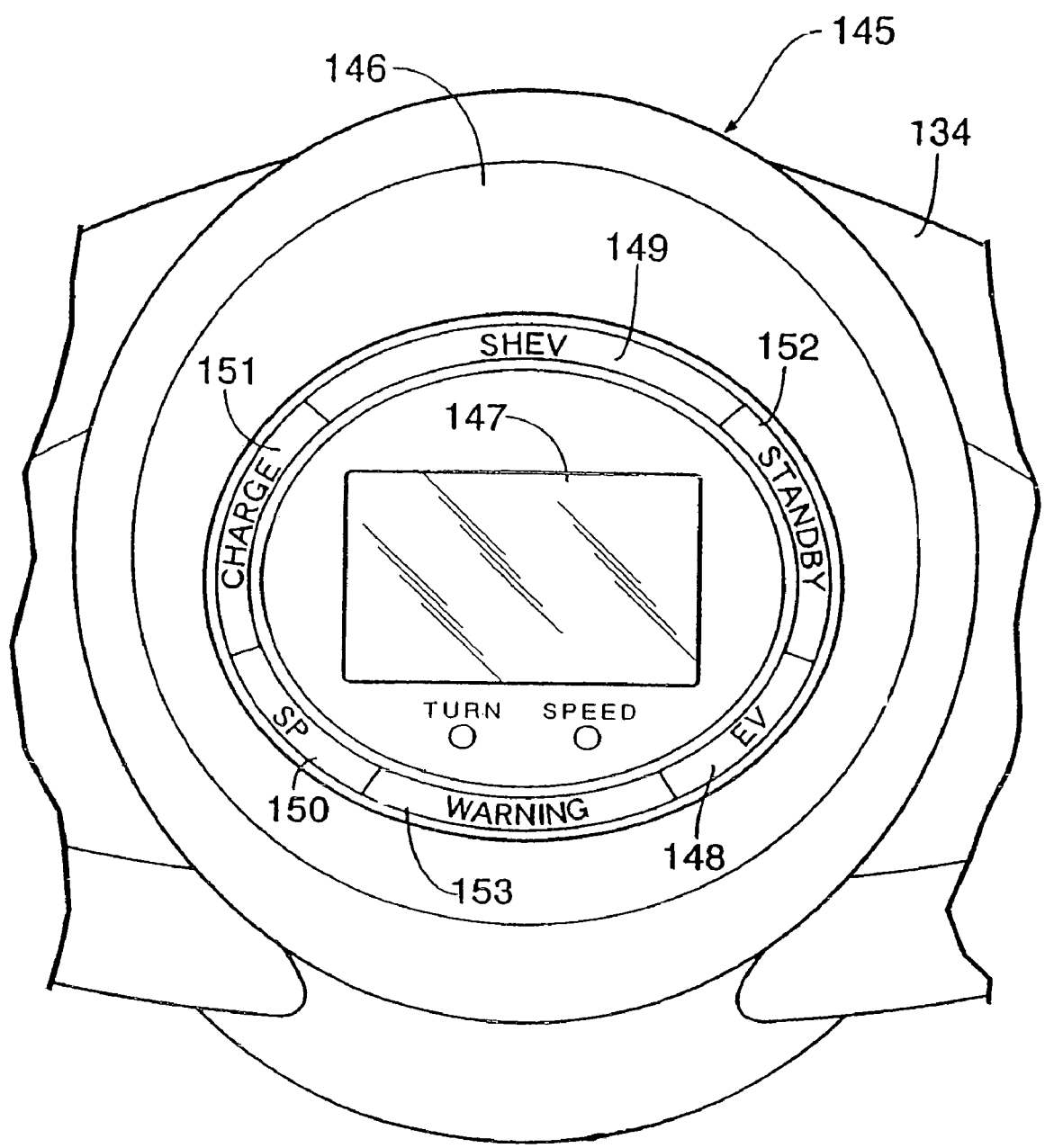
FIG. 8 is an enlarged view of an arrowed portion 8 in FIG. 6.

FIGS. 1 to 8 illustrate an embodiment of the present invention, of which FIG. 1 is a side view of a motorcycle to which the present invention is applied, FIG. 2 is a sectional view taken on line 2-2 in FIG. 1, FIG. 3 is a sectional view taken on line 3-3 in FIG. 2, FIG. 4 is a rear view of an exhaust muffler as seen in the direction of arrow 4 in FIG. 3, FIG. 5 is a sectional view taken on line 5-5 in FIG. 3, FIG. 6 is a plan view as seen in the direction of arrow 6 in FIG. 1, FIG. 7 is a sectional view taken on line 7-7 in FIG. 1, and FIG. 8 is an enlarged view of an arrowed portion in FIG. 6.

First, in FIG. 1, a motor driven vehicle illustrated therein is a scooter type motorcycle which is constructed as a hybrid type. A body frame F thereof comprises a head pipe 12 which supports a front fork 11, the front fork 11 supporting a front wheel WF through an axle at a lower end portion thereof, a front frame 13 extending backwardly downward from the head pipe 12, a pair of intermediate frames 14 branching right and left from a lower end of the front frame 13 and extending backward substantially horizontally, and a pair of rear frames 15 extending backwardly upward from rear ends of the intermediate frames 14.

A front portion of a power unit P is swingably supported at longitudinally intermediate portions of both rear frames 15. A rear cushion 17 is provided between one of both rear frames 15 and the power unit P, and a rear wheel WR as a driving wheel is supported through an axle by a rear portion of the power unit P.

In FIG. 2, the power unit P includes a 4-cycle engine E which is, for example, a water-cooled single cylinder engine capable of imparting a driving force to the rear wheel WR, a V belt type continuously variable transmission 18 capable of shifting the output of the engine E in a stepless manner, a starting clutch 19 interposed between the engine E and the continuously variable transmission 18, an electric motor 20 capable of imparting a driving force to the rear wheel WR, power transmission means 21 disposed between the electric motor 20 and the rear wheel WR, and a one-way clutch 22 interposed between the continuously variable transmission 18 and the power transmission means 21.

An engine body 25 of the engine E includes a crank case 27 which rotatably supports a crank shaft 26 having an axis of rotation parallel to that of the rear wheel WR, a cylinder block 28 connected to the crank case 27, a cylinder head 29 connected to the cylinder block 28 on the side opposite to the crank case 27, and a head cover 30 connected to the cylinder head 29 on the side opposite to the cylinder block 28.

The cylinder block 28 is disposed in such a manner that the axis of a cylinder bore 31 formed in the cylinder block 28 is positioned substantially horizontally while rising slightly forward in the advancing direction of the motorcycle. A piston 32 is slidably fitted into the cylinder bore 31 and is connected to the crank shaft 26 via a connecting rod 33.

A combustion chamber 34 is formed between the cylinder head 29 and the piston 32, and a spark plug 35 which faces the combustion chamber 34 is attached to a left side face of the cylinder head 29 while facing forward in the advancing direction of the motorcycle. A valve operating mechanism 37 is disposed between the cylinder head 29 and the head cover 30 so as to open and close an intake valve and an exhaust valve for controlling the intake of an air-fuel mixture into the combustion chamber 34 and exhaust from the same chamber. The valve operating mechanism 37 includes a cam shaft 36 which has an axis parallel to that of the crank shaft 26 and which is supported rotatably by the cylinder head 29. Rotating power from the crank shaft 26 is reduced to a half and is then transmitted to a right end portion of the cam shaft 36 while facing forward in the advancing direction of the motorcycle by engine timing transmission means 38.

A right end portion of the crank shaft 26 extends in a liquid-tight and rotatable manner through a mounting base 39 which is attached to right side faces of the crank case 27 and the cylinder block 28. An outer rotor 41 is fixed to the crank shaft 26 at a projecting portion from the mounting base 39, and an inner stator 42 which constitutes an ACG starter motor 40 in cooperation with the outer rotor 41 is fixed to the mounting base 39 so as to be enclosed by the outer rotor.

A cooling fan 43 is fixed to the crank shaft 26 at a position outside the ACG starter motor 40, and a radiator 44 is disposed at a position at which the radiator 44 sandwiches the cooling fan 43 in between the radiator 44 and the ACG starter motor 40. The radiator 44 is mounted to the crank case 27 and the cylinder block 28 via a shroud 45 which encloses the cooling fan 43. The radiator 44 is covered with a radiator cover 46 attached to the shroud 45, and a grille 47 for introducing cooling air from the exterior by the cooling fan 43 is formed in the radiator cover 46 in opposition to the radiator 44. Further, an exhaust port 48 for discharging air which has passed through the radiator 44 to the exterior is formed in the shroud 45 sideways of the cooling fan 43.

The V belt type continuously variable transmission 18 is contiguous to the engine body 25 while covering a part of the engine body sideways and is accommodated within a transmission case 50 which is extended up to the left side of the rear wheel WR. The transmission case 50 comprises an inner case 51 which is integrally contiguous to the crank case 27, an outer case 52 which covers the inner case 51 from the outside, and a gear case 53 which is secured to a rear portion of the inner case 51 on the side opposite to the outer case 52.

The continuously variable transmission 18 includes a driving pulley 54 which is mounted on an end portion of the crank shaft 26 extending from the crank case 27 into a front portion of the transmission case 50, a driven pulley 55 mounted on an output shaft 57 which has an axis parallel to that of the crank shaft 26 and which is supported rotatably by the gear case 53, and an endless V belt 56 for transmitting power from the driving pulley 54 to the driven pulley 55.

The driving pulley 54 includes a fixed pulley half 58 which is mounted on the crank shaft 26 via the starting clutch 19 and a movable pulley half 59 which is movable toward and away from the fixed pulley half 58. A belt groove is formed between the fixed pulley half 58 and the movable pulley half 59 for entrainment thereon of the V belt 56. Power for axially moving the movable pulley half 59 to change the width of the groove is transmitted from a controlling electric motor 60 disposed fixedly within the transmission case 50 to the movable pulley half 59 via a reduction gear mechanism 61.

The starting clutch 19 is a centrifugal clutch which transmits power from the crank shaft 26 to the fixed pulley half 58 when the number of revolutions of the crank shaft 26 is not less than a predetermined value, e.g., 3000 rpm.

The driven pulley 55 includes an inner cylinder 64 which encloses the output shaft 57 coaxially and relatively rotatably, an outer cylinder 65 which allows the inner cylinder 64 to be slidably fitted therein in a relatively pivotable manner about an axis and in a relatively movable manner in the axial direction, a fixed pulley half 66 fixed to the inner cylinder 64, a movable pulley half 67 fixed to the outer cylinder 65 in opposition to the fixed pulley half 66, a torque cam mechanism 68 which is disposed between the inner cylinder 64 and the outer cylinder 65 so as to exert an axial component of force between the movable and fixed pulley halves 67, 66 in accordance with a relative rotation phase difference between both pulley halves, and a spring 69 disposed in a compressed state between the inner cylinder 64 and the movable pulley half 67 so as to develop a biasing force on the side on which the movable pulley half 67 is moved toward the fixed pulley half 65.

The spacing between the fixed pulley half 66 and the movable pulley half 67 in the driven pulley 55 is determined by a balance among an axial force developed by the torque cam mechanism 68, an axial resilience of the spring 69 and the force provided from the V belt which acts in a direction to widen the spacing between both pulley halves 66, 67. As the entrainment radius of the V belt 56 onto the driving pulley 54 is made larger by approximating the movable pulley half 59 to the fixed pulley half 58 in the driving pulley 54, the entrainment radius of the V belt 56 onto the driven pulley 55 becomes smaller.

The electric motor 20 capable of imparting power to the rear wheel WR is composed of an outer stator 72 fixed to a motor case 71, the motor case 71 being fixed to the outer case 52 so as to close an opening 70 formed in a rear portion of the outer case 52 in the transmission case 50, and an inner rotor 73 which is mounted on the output shaft 57 so as to be incapable of relative rotation. When the electric motor 20 is in operation, its rotating power can be transmitted to the output shaft 57.

The one-way clutch 22 is interposed between the inner cylinder 64 of the driven pulley 55 and the inner rotor 73 of the electric motor 20. While the output of the engine E is transmitted to the output shaft 57 by the continuously variable transmission 18, the one-way clutch 22 permits power to be transmitted from the inner cylinder 64 to the inner rotor 73 to let the electric motor 20 function as a generator.

An axle 74 is supported rotatably by both inner case 51 and gear case 53, and a hub 75 of the rear wheel WR is fixed to an end portion of the axle 74 projecting from the transmission case 50.

The power transmission means 21 is a reduction gear train disposed between the output shaft 57 and the axle 74 and comprises a first gear 77 mounted on the output shaft 57, a second gear 78 mounted on an intermediate shaft 76 and meshing with the first gear 77, the intermediate shaft 76 being supported rotatably by the inner case 51 and the gear case 53 in parallel with the output shaft 57 and the axle 74, a third gear 79 mounted on the intermediate shaft 76, and a fourth gear 80 mounted on the axle 74 and meshing with the third gear 79.

An outside air intake port 81 for the intake of cooling air into the transmission case 50 is formed in a side wall of the portion of the outer case 52 in the transmission case 50 which portion is opposed to the driving pulley 54, and a cooling fan 82 for dispersing the cooling air introduced from the outside air intake port 81 into the transmission case 50 is mounted on an end portion of the crank shaft 26 at a position outside the driving pulley 54.

A filter case 83 is attached to an outer surface of the outer case 52 so as to cover the outside air intake port 81 from the outside. Outside air introduced into the filter case 83 from a suction port 84 formed in the filter case 83 is purified by passing through a filter element 85 provided within the filter case 83 and is introduced into the transmission case 50 from the outside air intake port 81.

Referring also to FIG. 3, an intake system 88 of the engine E includes an air cleaner 89 for purifying the outside air, an intake hose 90 for introducing the purified air from the air cleaner 89, a carburetor 91 connected to a downstream end of the intake hose 90, and an intake pipe 92 which connects between an upper side face of the cylinder head 29 in the engine E and the carburetor 91. The air cleaner 89 is disposed backward from above the power unit P on the left side of the rear wheel WR in a state in which it faces forward in the advancing direction of the motorcycle.

An exhaust system 94 of the engine E includes an exhaust pipe 95 whose upstream end is connected to a side face of a lower portion of the cylinder head 29 and which, in a state facing forward in the advancing direction of the motorcycle, extends backward toward the right side of the rear wheel WR, and an exhaust muffler 96 disposed on the right side of the rear wheel WR while sandwiching the rear wheel WR between the exhaust muffler 96 and the power unit P and connected to a downstream end of the exhaust pipe 95.

Referring also to FIGS. 4 and 5, a casing 97 of the exhaust muffler 96 comprises a first case 98, the first case 98 being constituted by a longitudinally extending cylindrical body 100 whose front and rear ends are closed with semispherical end caps 101 and 102, and a second case 99, the second case 99 being constituted by a pair of case halves 103 and 104 coupled together at mating surfaces extending in the longitudinal direction of the motorcycle, the second case 99 being connected on top of the first case 98. The second case 99 is formed in an upwardly expanded shape from the first case 98 when seen sideways.

An inner pipe 106 having many small holes 105 is coaxially inserted and fixed into the cylindrical body 100 of the first case 98, and a sound absorbing material 107 is loaded between the cylindrical body 100 and the inner pipe 106. An outer periphery of a disc-like partition plate 108 is fixed to an inner surface of the inner pipe 106 at a position near the rear end of the inner pipe. With the partition plate 108, the interior of the first case 98 is partitioned into a first expansion chamber 109 located on the front side and a third expansion chamber 111 located on the rear side.

Inner wall members 112 and 113 having many small holes are welded at plural positions and at outer peripheral edges thereof to inner surfaces of the case halves 103 and 104 which constitute the second case 99, and sound absorbing materials 114 and 115 are loaded between the case halves 103, 104 and the inner wall member 112, 113. Within the second case 98, a second expansion chamber 110 which is defined by the inner wall members 112, 113 and an upper outer surface of the first case 97 is formed so as to be positioned above the first and third expansion chambers 109, 111.

Exhaust gas conducted by the exhaust pipe 95 is introduced into the first expansion chamber 109 by a first conduit 116. The first conduit 116 integrally includes first and second straight pipe portions 116a, 116c extending in parallel with the axis of the cylindrical body 100 in the first case 98 and a generally U-curved pipe portion 116b which connects between the first and second straight pipe portions 116a, 116c. The first straight pipe portion 116a extends within the first expansion chamber 109 in parallel with the axis of the first case 98 through the end cap 101 located at the front end of the first case 98 and further through the lower portion of the partition plate 108. An upstream end of the first straight pipe portion 116a is connected to a downstream end of the exhaust pipe 95. The second straight pipe portion 116c extends forward within the first expansion chamber 109 and through the upper portion of the partition plate 108 and its downstream end is opened. The curved pipe portion 116b is disposed within the third expansion chamber 111 so as to connect between a downstream end of the first straight pipe portion 116a and an upstream end of the second straight pipe portion 116c.

Exhaust gas introduced into the first expansion chamber 109 through the first conduit 116 is conducted into the second expansion chamber 110 by the second conduit 117. The second conduit 117 is formed in a generally C-curved shape so as to extend through the end cap 102 at the rear end of the first case 98 and further through the partition plate 108. An upstream end of the second conduit 117 is opened to the first expansion chamber 109 and a downstream end thereof is opened to the second expansion chamber 110.

The exhaust gas introduced into the second expansion chamber 110 through the second conduit 117 is then conducted into the third expansion chamber 111 by a third conduit 118. The third conduit 118 is formed in a generally J shape so as to be open with its upstream end located within the third expansion chamber 111 facing forward. The third conduit 118 extends through the end cap 102 located at a rear end of the first case 98 so as to be open into the third chamber 111. The exhaust gas present in the third expansion chamber 111 is discharged to the exterior through an exhaust pipe 119.

A support bracket 120 is provided on the casing 97 of the exhaust muffler 96 so as to project forward from the casing 97. The support bracket 120 is secured to the engine body 25. The exhaust muffler 96 is disposed so as to sandwich the rear wheel WR between the exhaust muffler 96 and the electric motor 20 which constitutes a part of the power unit P. Further, the exhaust muffler 96 is disposed in such a manner that a central position C thereof extending in the longitudinal direction of the body frame F lies at a longitudinally rear position by a distance L with respect to the axis of rotation of the electric motor 20, i.e., the axis of the output shaft 57, as shown clearly in FIG. 2.

Referring also to FIG. 6, the air cleaner 89 which is at least a part of the intake system 88, the exhaust muffler 96 which constitutes a part of the exhaust system 94, the transmission case 50 in which the electric motor 20 of the power unit P is disposed, and the rear wheel WR, are covered with a common cover 125. The cover 125 integrally comprises a rear fender portion 125a which covers the rear wheel WR, a left cover portion 125b disposed contiguously on the left side of the rear fender portion 125a so as to cover the transmission case 50 in the power unit P and the air cleaner 89 in the exhaust system 88, and a right cover portion 125c disposed contiguously on the right side of the rear fender portion 125a so as to cover the exhaust muffler 96 in the exhaust system 94. The cover 125 is formed of a synthetic resin.

Besides, a lower portion of the first expansion chamber 109 provided in the exhaust muffler 96 is located at an upper position close to a lower-end opening edge of the right cover portion 125c of the cover 125.

The electric motor 20 in the power unit P is disposed on one side, left side in this embodiment, in the width direction of the body frame F in such a manner that at least a part of the motor case 71 is exposed to the exterior from a side face of the transmission case 50. Intake- and exhaust-side vent holes 126, 127 for cooling the portion of the motor case 71 exposed from the transmission case 50 with running wind are formed in a side face of the cover 125 which faces one side in the width direction of the body frame F, i.e., in the left cover portion 125b of the cover 125.

The intake-side vent hole 126 is formed in the left cover portion 125b of the cover 125 on the front side in the advancing direction of the motorcycle with respect to the electric motor 20, while the exhaust-side vent hole 127 is formed in the left cover portion 125b on the rear side in the advancing direction of the motorcycle with respect to the electric motor 20.

As shown clearly in FIG. 2, a circular opening 128 corresponding to the electric motor 20 is formed in the left cover portion 125b of the cover 125, and a circular cover portion 129 is integral with the left cover portion 125b so as to cover the opening 128 from the outside. The intake-side vent hole 126 is formed between front ends of the left cover portion 125b and the cover portion 129, while the exhaust-side vent hole 127 is formed between rear ends of the left cover portion 125b and the cover portion 129.

A guide recess 130 is formed in the left cover portion 125b of the cover 125 on the front side in the advancing direction of the motorcycle with respect to the electric motor 20. The guide recess 130 is recessed inwards so as to become larger in the amount of recess, that is, become wider, toward the rear side, i.e., toward the cover portion 129. The intake-side vent hole 126 is disposed contiguously to the rear end of the guide recess 130.

Referring now to FIGS. 1 and 6, the front side of the head pipe 12 is covered with a front cowl 131 of a synthetic resin, and the steering handle 16 is covered with a handle cover 134 of a synthetic resin exclusive of grips 132 and 133 formed at both ends. The rear side of the head pipe 12 is covered with a center cowl 135 of a synthetic resin, and leg shields 136 of a synthetic resin are disposed on both sides of the center cowl 135 contiguously to the front cowl 131 and the center cowl 135.

A floor panel 137 of a synthetic resin is fixed onto the pair of right and left intermediate frames 14 of the body frame F so as to be positioned behind the center cover 125. A pair of side under cowls 138 of a synthetic resin are connected respectively to both sides of the floor panel 137.

The rear portion of the body frame F and a part of the engine E are made of a synthetic resin and are covered with a rear cover 139 which is supported by the rear frames 15. A rider seat 140 is disposed on the rear cover 139 so that the rider seat 140 can be opened and closed.

The floor panel 137 and portions of the pair of right and left side cowls 138 connected to both sides of the floor panel 137 are covered by applying thereto a rubber mat 141 elastically from above, the rubber mat 141 having a downwardly open, generally U-shaped cross-sectional shape.

With the rubber mat 141, not only the fixing portions of the floor panel 137 to the intermediate frames 14 and the connections of the floor panel 137 to both side under cowl 138 are hidden, but also mud and water can be prevented from staying within depressions or holes which are formed for fixing the floor panel 137 to the intermediate frames 14. Thus, it becomes possible to improve the appearance and maintainability. Moreover, by covering the upper portions of the side under cowls 138 with both side portions of the rubber mat 141, the rubber mat 141 can be endowed with a protecting function of protecting the side under cowls 138 from damage.

Besides, when the rider sitting on the rider seat 140 puts his or her feet on the rubber mat 141, the grippability can be made higher than when the rider puts his or her feet directly on the floor panel 137 of a synthetic resin.

Further, as shown in FIG. 6, if such grooves 142 as permit water present on the rubber mat 141 to flow longitudinally are formed on both sides of an upper surface of the rubber mat 141, it is possible to improve drainage from the upper surface of the rubber mat 141.

In FIG. 8, an indicator device 145 is provided centrally of the handle cover 134. The indicator device 145 comprises a speed indicating portion 147 for indicating the running speed of the motorcycle, plural running mode indicating portions 148, 149 and 150 for indicating plural running modes of the hybrid type motorcycle each independently, and vehicle operating condition indicating portions 151, 152 and 153 for indicating operating conditions of the motorcycle. These indicating portions as components of the indicator device 145 are arranged on a common indicating surface 146.

The indicating surface 146 is formed in a circular shape. The plural running mode indicating portions 148, 149 and 150 and vehicle operating condition indicating portions 151, 152 and 153 are each formed in a generally arcuate shape, are adapted to indicate conditions by lighting and are arranged in a contiguously endless manner around the speed indicating portion 147. Besides, the plural running mode indicating portions 148, 149 and 150 and vehicle operating condition indicating potions 151, 152 and 153 have mutually different indication colors.

The plural running mode indicating portions 148, 149 and 150 are adapted to respectively indicate an electric running mode (EV mode) in which the motorcycle runs with the electric motor 20 alone, a series hybrid mode (SHEV mode) in which the electric motor 20 is driven by electric power generated by the ACG starter motor 40 which is driven by the engine E, and a sports mode (SP mode) in which an accelerated feeling is obtained by differentiating the shift characteristic of the continuously variable transmission from that in normal condition. The vehicle operating condition indicating portions 151, 152 and 153 are for indicating a battery charge condition, a stand-by condition and a warning condition each independently.

The operation of this embodiment will now be described. The air cleaner 89 which is at least a part of the intake system 88 contiguous to the engine capable imparting power to the rear wheel WR, and the exhaust muffler 96 which constitutes a part of the exhaust system 94 contiguous to the engine E, are covered with a common cover 125 together with the rear wheel WR. Since the electric motor 20 capable of imparting power to the rear wheel WR is covered with the cover 125 together with the transmission case 50 in which the electric motor 20 is accommodated, noises generated in the intake system 88 and the exhaust system 94, as well as noise generated in the electric motor 20, can be prevented from leaking to the exterior as far as possible and thus a soundproofing effect can be obtained. Moreover, the transmission case 50 is protected with the cover 125 and it is possible to improve the appearance design performance.

Besides, since the axis of rotation of the electric motor 20 is located on the front side in the longitudinal direction with respect to the central position C of the exhaust muffler 96 which extends in the longitudinal direction of the body frame F, the influence of heat generated in the exhaust muffler 96 can be prevented from being exerted on the electric motor 20 as far as possible.

Since the electric motor 20 and the exhaust muffler 96 are disposed at positions sandwiching the rear wheel WR from both sides, the influence of heat generated in the exhaust muffler 96 can be prevented more effectively from being exerted on the electric motor 20.

The exhaust muffler 96 is provided with the first expansion chamber 109 into which the exhaust gas from the engine E is introduced and the second expansion chamber 110 disposed above the first expansion chamber 109 so that the exhaust gas from the first expansion chamber 109 is introduced therein. Since the lower portion of the first expansion chamber 109 is disposed at an upper position close to the lower-end opening edge of the right cover portion 125c of the cover 125, the exhaust muffler can be cooled with running wind, whereby it is possible to minimize the influence of heat from the exhaust muffler 96 on the electric motor 20.

The electric motor 20 is accommodated in the transmission case 50 of the power unit P in a state in which at least a part of the motor case 71 of the electric motor 20 is exposed to the exterior, and the intake- and exhaust-side vent holes 126, 127 for cooling the portion of the motor case 71 exposed from the transmission case 50 with running wind are formed in the left cover portion 125b of the cover 125 which covers the transmission case 50, it is possible to conduct the running wind inside the cover 125 and thereby cool the electric motor 20 effectively.

Since the intake-side vent hole 126 is formed in the left cover portion 125b of the cover 125 on the front side in the vehicle advancing direction with respect to the electric motor 20 and the exhaust-side vent hole 127 is formed in the left cover portion 125b of the cover 125 on the rear side in the vehicle advancing direction with respect to the electric motor 20, the running wind is introduced into the cover 125 from the intake-side vent hole 126 on the front side of the electric motor 20 in the vehicle advancing direction, flows sideways of the motor case 71 and is thereafter discharged to the exterior from the exhaust-side vent hole 127 located behind the electric motor 20, whereby the electric motor 20 can be cooled more effectively.

Further, the guide recess 130 which is recessed inwards so as to become larger in the amount of recess toward the rear side is formed in the left cover portion 125b of the cover 125 on the front side in the vehicle advancing direction with respect to the electric motor 20, and the intake-side vent hole 126 is formed contiguously to the rear end of the guide recess 130. Consequently, the running wind is guided to the intake-side vent hole 126 by the guide recess 130 and thus can be conducted effectively into the cover 125 without creating any projecting portion on the outer surface of the cover 125. Therefore, while the size of the cover 125 is reduced as a whole, it is possible to conduct the running wind effectively to the electric motor 20 and thereby cool the electric motor effectively.

Further, the electric motor 20 is disposed in such a manner that at least a part of the motor case 71 is exposed to the exterior from a side face of the transmission case 50 on the left side in the width direction of the body frame F, and the intake- and exhaust-side vent holes 126, 127 are formed in a side face of the cover 125 which faces the left side in the width direction of the body frame F. Therefore, the air passing sideways of the cover 125 on the left side in the width direction of the body frame F can be conducted as running wind into the cover 125 effectively and the electric motor 20 can be cooled by the running wind more effectively.

In the central part of the handle cover 134 which covers the steering handle 16 exclusive of both-end grips 132 and 133, there is disposed the indicator device 145. The indicator device 145 comprises, on a common indicating surface 146, the speed indicating portion 147 for indicating the running speed of the motorcycle, the plural running mode indicating portions 148, 149 and 150 for indicating plural running modes of the motorcycle each independently, and the vehicle operating condition indicating portions 151, 152 and 153 for indicating operating conditions of the motorcycle. The plural running mode indicating portions 148, 149 and 150 and vehicle operating condition indicating portions 151, 152 and 153 are arranged in a contiguously endless manner around the speed indicating portion 147.

According to the indicator device 145 constructed as above, it is possible to decrease the amount of movement of the rider's eyes and thereby easily check the running speed, plural running modes and vehicle operating conditions. Besides, it is possible to effect an efficient layout of the indicating portions 147, 148 to 150 and 151 to 153 on the indicating surface 146.

Moreover, since the plural running mode indicating portions 148 to 150 and vehicle operating condition indicating portions 151 to 153 are each formed in a generally arcuate shape, it is possible to ensure relatively large indication areas of the running mode indicating portions 148 to 150 and the vehicle operating condition indicating portions 151 to 153 and hence it is possible to let the rider visually check vehicle operating conditions and running modes more effectively.

Besides, since the running mode indicating portions 148, 149 and 150 and the vehicle operating condition indicating portions 151, 152 and 153 have mutually different indication colors, it is possible to let the rider visually check vehicle operating conditions and running modes clearly.

Further, the motorcycle according to this embodiment is a hybrid type having the engine E in addition to the electric motor 20, and the plural running mode indicating portions 148 to 150 include an electric running mode in which the vehicle runs with the electric motor 20 alone, a special running mode in which the shift control is different from the normal shift control, and a series hybrid running mode in which the electric motor 20 is driven with electric power generated by the ACG starter motor 40 which is driven by the engine E. That is, in the scooter type motorcycle which has a larger number of running modes because of the hybrid type, the indicating portions 147, 148 to 150 and 151 to 153 in the indicator device 145 can be arranged efficiently.

Although an embodiment of the present invention has been described above, the present invention is not limited to the above embodiment, but various design changes may be made without departing from the gist of the present invention described in the claims.

For example, although in the above embodiment the present invention is applied to a scooter type hybrid motorcycle having the engine E capable of imparting power to the rear wheel WR and the electric motor 20, the present invention is also applicable to a motor driven vehicle in which a driving wheel is driven by an electric motor alone.

I claim:

1. An indicator device for a motor driven vehicle, comprising:
   a speed indicating portion for indicating the running speed of the motor driven vehicle provided with an electric motor capable of imparting power to a driving wheel;
   plural running mode indicating portions for individually indicating a plurality of running modes of the motor driven vehicle; and
   vehicle operating condition indicating portions for indicating operating conditions of the vehicle, wherein
   said speed indicating portion, said plural running mode indicating portions, and said vehicle operating condition indicating portions are arranged on a common indicating surface, and
   said plural running mode indicating portions and said vehicle operating condition indicating portions are arranged in a continuously endless manner around said speed indicating portion.

2. An indicator device for a motor driven vehicle according to claim 1, wherein said plural running mode indicating portions and said vehicle operating condition indicating portions are each formed in a generally arcuate shape.

3. An indicator device for a motor driven vehicle according to claim 1, wherein said plural running mode indicating portions and said vehicle operating condition indicating portions have mutually different indication colors.

4. An indicator device for a motor driven vehicle according to claim 2, wherein said plural running mode indicating portions and said vehicle operating condition indicating portions have mutually different indication colors.

5. An indicator device for a motor driven vehicle according to claim 1, wherein the motor driven vehicle is a hybrid type vehicle having an engine in addition to said electric motor, and wherein said plural running mode indicating portions comprise:
   a motor running mode in which the vehicle runs with only the electric motor,
   a special running mode in which a shift control is different from a normal shift control, and
   a series hybrid running mode in which said electric motor is driven with electric power generated by a generator, said generator being driven by an engine.

* * * * *